United States Patent [19]

Hamilton et al.

[11] Patent Number: 5,287,507

[45] Date of Patent: Feb. 15, 1994

[54] METHOD AND APPARATUS FOR PORTABLE OBJECT HANDLES THAT USE LOCAL CACHES

[75] Inventors: Graham Hamilton, Palo Alto; Michael N. Nelson, San Carlos, both of Calif.

[73] Assignee: Sun Microsystems, Inc., Mountain View, Calif.

[21] Appl. No.: 858,788

[22] Filed: Mar. 27, 1992

[51] Int. Cl.$^5$ .............................................. G06F 15/16
[52] U.S. Cl. ............................. 395/650; 364/DIG. 1; 364/243.41; 364/242.94
[58] Field of Search ......................................... 395/650

[56] References Cited

U.S. PATENT DOCUMENTS 4,887,204 12/1989 Johnson et al. ...................... 364/200
5,136,716 8/1992 Harvey et al. ....................... 395/800

OTHER PUBLICATIONS

"Caching in the Sprite Network File System", Michael N. Nelson et al., ACM Transactions . . . , vol. 6, No. 1, Feb. 1988, pp. 134-154.
"A Caching File System for a Programmer's Workstation", Michael D. Schroeder et al., 1985.
"The Eden System: A Technical Review", Guy T. Almes et al., IEEE Transactions . . . , vol. SE-11, No. 1, Jan. 1985, pp. 43-59.
"Distributed Programming in ARGUS", Barbara Liskov, Communications of the ACM, vol. 31, No. 3, Mar. 1988, pp. 300-312.
"The Sprite Network Operating System", J. Ousterhout et al., IEEE Computer, Feb. 1988, pp. 23-36.
"MACH: A New Kernel Foundation for UNIX Development", Mike Accetta et al., Proceedings of the Summer '86, pp. 93-112.
"MACH 3 Kernal Principles", Keith Loepere, Open Software Foundation and Carnegie Mellon University.

Primary Examiner—Gareth D. Shaw
Assistant Examiner—A. Katbab
Attorney, Agent, or Firm—Erwin J. Basinski

[57] ABSTRACT

A method and apparatus for client programs adapted for use in an object oriented, distributed computing system, to have the ability to communicate and use references to objects in a way which improves the benefits of software caching are disclosed. A mechanism is described whereby a network object handle (an augmented object handle) can be used to reference both a server and a local cache manager. When the augmented object handle is transmitted it is automatically updated to use a local cache manager in its target environment (i.e. on the same machine on which the receiving client program resides) if possible.

31 Claims, 5 Drawing Sheets

METHOD AND APPARATUS FOR PORTABLE OBJECT HANDLES THAT USE LOCAL CACHES

BACKGROUND OF THE INVENTION

1. Field of the Invention

The present invention relates to the fields of distributed computing systems, client-server computing and object oriented programming. Specifically, the present invention is a method and apparatus for providing client programs the ability to communicate and use references to objects such that the full benefit of software caching are obtained on each machine where the objects are used.

2. Background

In an object oriented system, an object is a component comprising data and operations which can be invoked to manipulate the data. The operations are invoked on the object by sending calls to the object. Each object has an object type. The object type defines the operations that can be performed on objects of that type. The object operations are implemented independent of the objects themselves. Additionally, one object type may inherit the object operations defined and implemented for other object types. For further description of object oriented design and programming techniques see "Object-oriented Software Construction" by Bertrand Meyer, Prentice-Hall 1988.

In client-server computing, typically there is a set of computers that can communicate with one another through a network connecting the computers. Some of these computers act as providers of services or functions to other computers. The providers of such service or functionality are known as "servers", and the consumers of such service or functionality are called "clients". The client-server model also generalizes to the case where distinct programs running on the same computer are communicating with one another through some protected mechanism and are acting as providers and consumers of functionality.

In object oriented distributed systems based upon the client-server model, there exist servers that provide object oriented interfaces to their clients. These servers support objects consisting of data and the associated software. Clients may obtain access to these objects and may execute calls on them. These calls are transmitted to the server from the client. At the server these calls are executed via the software associated with the object. The results of these calls are then transmitted back to the client.

Client programs reference particular objects by means of object handles. An "object handle" is an identifier which provides a way of locating an object (the "target object") and of executing calls on it. Client programs are typically given object handles by another program or by the operating system kernel at program initiation. If a given client program has an object handle referencing a particular object then that client program can pass a copy of that object handle to another client program. The second client program can then use the object handle to access the object.

Object handles are implemented in a variety of ways. For example, one known system uses object handles consisting of two components. Component A is the network address of the server, and component B is an identifier of the target object relative to that server. When an object invocation is performed, the client sends the object invocation to the network address specified by component A and also transmits the identifier specified by component B. The server then uses component B to identify the particular object that is being invoked. Another system, the Emerald system, also uses an object handle that consists of two components. The first, called an "object identifier", is an integer value that acts as a unique identifier for the object. The second component, called the "forwarding address", contains a hint about the network address where the object currently resides. When an Emerald client wishes to communicate with the object it must determine the current network address of that object. See "Fine-Grained Mobility in the Emerald System", by Eric Jul, Henry Levy, Norman Hutchinson and Andrew Black, ACM Transactions on Computer Systems, 6(1) 1988, pp. 109-133. Other systems use various other formats for object handles. These object handles shall be characterized herein as "simple object handles" and their variety of formats is irrelevant to the present invention as more fully described below.

These "simple object handles" are not adequate to allow a distributed system to take full advantage of software caching. "Software Caches" are used in many operating systems to improve system performance. For example, file Caching is implemented by retaining in main memory a few of the most recently accessed disk blocks. File Caching has been implemented on servers, providing data five to ten times faster than similar data fetched from the disk. Software caching provides similar efficiencies in distributed systems. Using the caching technique, the client does not communicate directly with the server but rather with a cache manager program which is typically running on his machine. The cache manager will attempt to maintain some internal state that reflects part of the state of the server so that the cache manager can respond to client requests without always needing to communicate with the server. This technique reduces the time for the client's operations to be performed while also reducing the number of operations that must be performed by the server.

Such software caching can be implemented in an object oriented distributed system, where the caching is implemented using objects. However, due to the limitations of the "simple object handles", the benefits of caching at the client machine level are obviated in certain situations. For example, whenever a client program running on one machine, passes the "simple object handle" to another client program which is running on a different machine, a problem develops. This problem is explained more fully in the detailed description of the present invention below. However, generally, the problem arises because the object handle which the first program was using was actually a pointer to a cache manager on the first program's machine rather than a pointer to the target object itself. Thus when the first program passes "its" object handle to a program on another machine, the receiving program has no present way of knowing where the object handle is pointing. And in this situation, an inefficiency occurs because the receiving program's invocation of an operation on the target object results, not in a call to a cache manager on the receiving program's machine or on the server containing the target object, but rather results in a call on the cache manager in the machine of the program that sent the object handle to the receiving program. This unfortunate situation negates the benefits of local machine caching completely. The present invention solves this problem by having the sending program give the receiving program an additional reference to the target object.

Accordingly, the present invention provides an apparatus and a method comprising an augmented object handle (in the preferred embodiment called the "Extended Cachable Handle") which will provide the ability for a client to automatically select a cache manager running on its own machine (if any), and if its machine has several different cache managers specializing in caching different kinds of objects, the Extended Cachable Handle will permit the automatic selection of a cache manager based upon the actual characteristics of the target object. If no local cache manager is available, the receiving program has the ability to access the target object directly, without reference to the transmitting program's machine.

SUMMARY OF THE INVENTION

It is therefore an objective of the present invention to provide a means for using software caching services as efficiently as possible in an object oriented, distributed computing system.

In the present invention, a client program is given an augmented object handle which contains references to a cache manager and to the target object. The receiving client program can modify the augmented object handle by replacing the cache manager reference which it received, with a reference to a local cache manager on the receiving program's machine or with a reference to the target object itself. This allows the receiving client program to use the modified augmented object handle to efficiently invoke operations on the target object.

In the preferred embodiment of the invention, the augmented object handle is called an extended cachable handle which contains a reference to the target object which is called the back handle, and additional references which are called the front handle and the cache service name. The client program which receives the extended cachable handle uses the local machine naming service to map the cache service name portion of the extended cachable handle onto a cache manager on that machine (a "local" cache manager) which is suitable for caching the kind of target object indicated by the back handle portion of the extended cachable handle. The client program then provides the back handle to the identified cache manager and requests that the cache manager provide caching service for it. If the cache manager can do so, it returns a handle that references a local object in the cache manager which the client program uses as a new front handle. The client program then fabricates a new extended cachable handle to use by combining the back handle and cache service name which it originally received with the new front handle. If no cache manager was identified or if the one identified refused to perform the caching service then the client program fabricates the new extended cachable handle by simply copying the back handle into the front handle.

An alternative embodiment of the invention is also described, wherein the augmented object handle is called a "simple cachable handle". In this simple cachable handle the target object handle is called the back handle and there is only one additional reference called the front handle. In this embodiment, the receiving client program must have an inherent ability to select a suitable cache manager on its own machine, whereas this selection task is done automatically in the preferred embodiment. Nevertheless, in this alternative embodiment, having selected a local cache manager, the subsequent procedures in using the front and back handles are the same as in the preferred embodiment.

DESCRIPTION OF THE DRAWINGS

The objectives, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

A method and an apparatus for client programs to have the ability to communicate and use references to objects in a way which improves the benefits of local machine caching are disclosed. In the following description for purposes of explanation, specific data and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
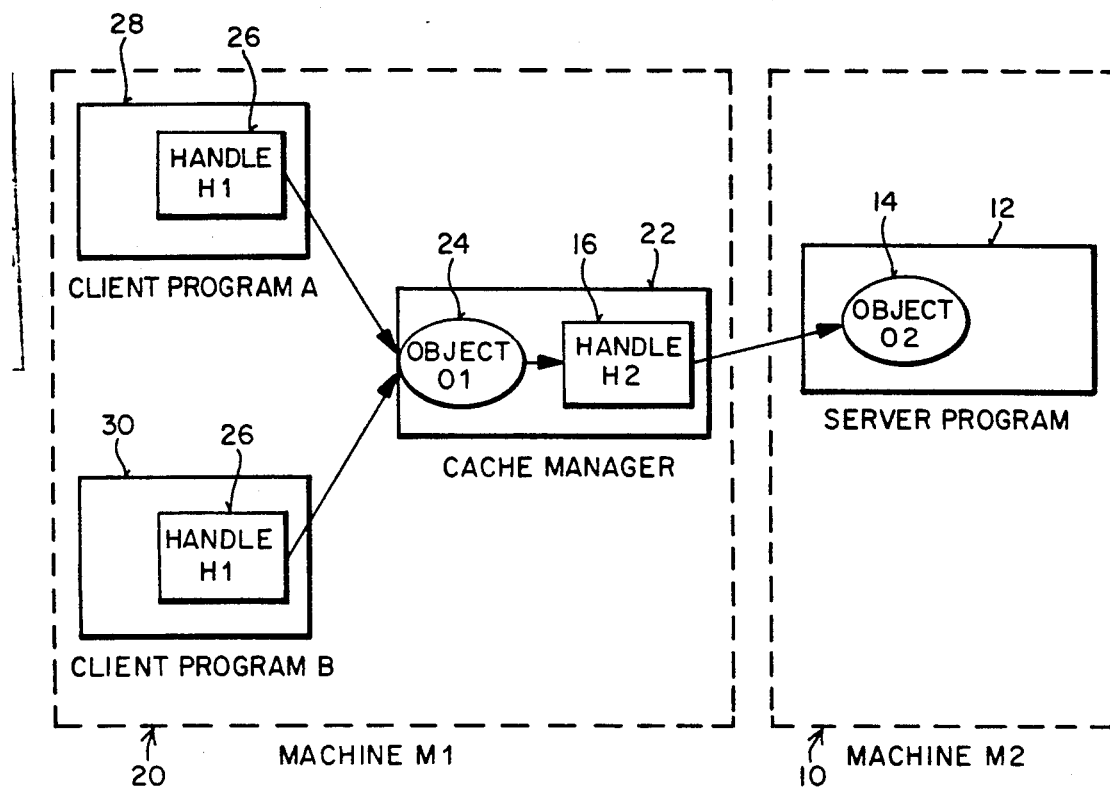
FIG. 1 illustrates a method of software caching in an object oriented distributed system using simple object handles known in the prior art.

Referring now to FIG. 1, a block diagram shows a typical client and server in a distributed computing system, wherein the client and server reside on different machines, both of which employ caching which is implemented using objects. The server program 12 implements an object O2 14 which is identified by handle H2 16. The cache manager 22 implements an object O1 24, identified by the handle H1 26, whose sole duty is to support the caching of object O2 14. Clients who wish to access the object O2 while obtaining the benefits of caching will use the handle H1 26 which points at the cache manager 22. When a client issues an operation on the handle H1 26 it is transmitted to the object O1 24 in the cache manager 22. The cache manager 22 may then implement the operation itself or it may use its handle H2 16 to forward the request to the object O2 14 residing in the server program 12. Client program A 28 can pass a copy of the handle H1 26 to client program B 30 and both client programs 28,30 can use the object handle H1 26 to access the object. However, a complication arises if client programs which reside on different machines attempt to access the same object using the same handle H1 26.

Figure 2:
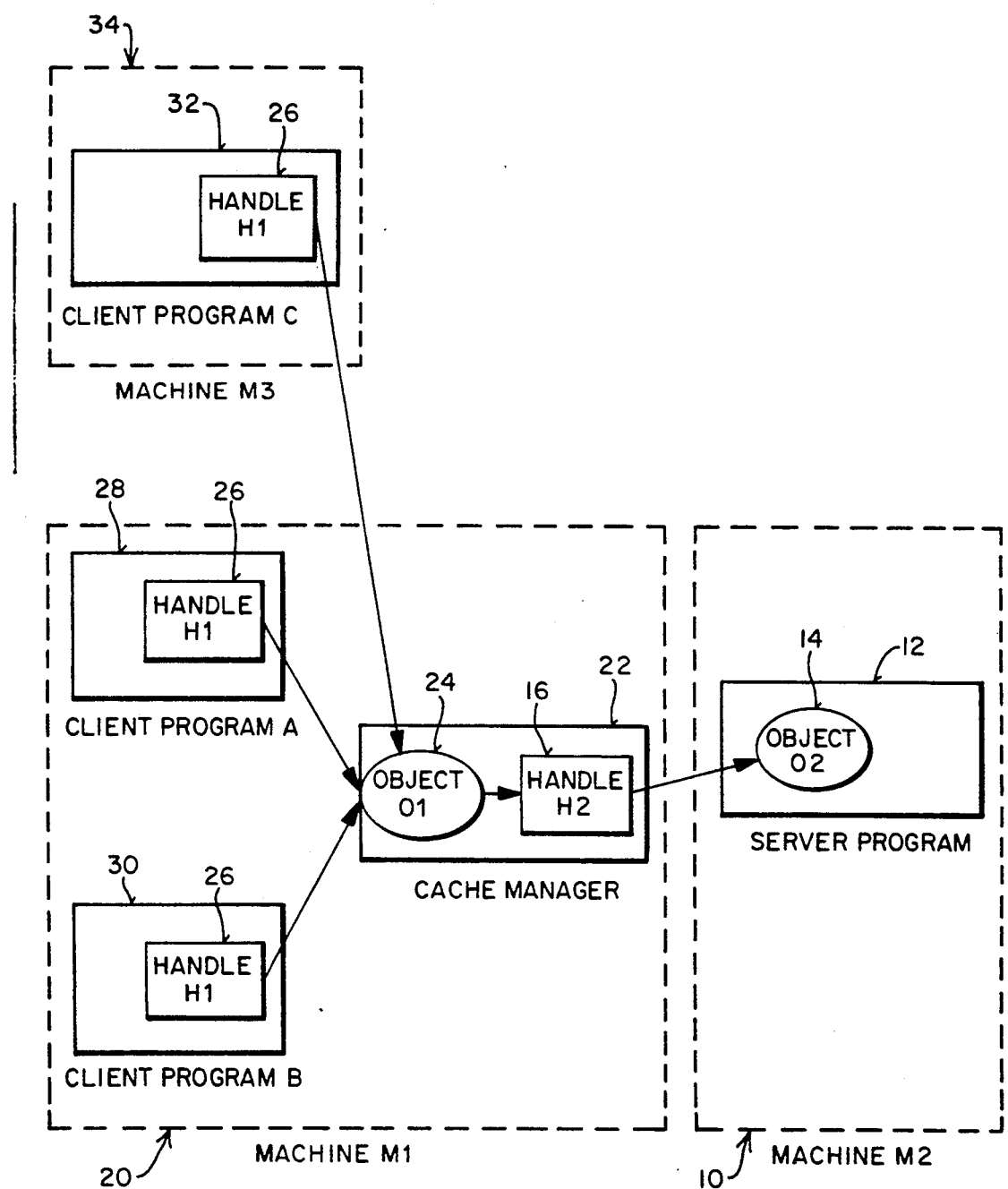
FIG. 2 illustrates the problem of using prior art simple object handles in an object oriented distributed system which uses client caching.

Referring now to FIG. 2, if a client program 28,30 on machine M1 20 passes its handle H1 26 to a client program C 32 on machine M3 34, the client program C 32 on M3 34 will use the cache manager 22 on machine M1 20. This situation negates many of the advantages of caching and may actually be less efficient than if client program C 32 could access the server program 12 directly. It is preferable that client programs on machine M3 34 always go through a cache manager that runs on machine M3 34.

In the following description of the present invention, two solutions for this problem are disclosed. The first solution is an alternative embodiment which has application when the client program which receives an object handle knows in advance which cache manager on his machine to use for each object. In the preferred embodiment of the invention, this first solution is extended to permit the automatic selection of an appropriate cache manager. In both of these solutions, the exact format of the simple object handle being used is immaterial to the present invention. Both solution mechanisms are built on whatever kind of simple object handle is already in use in the system. Thus, in the Emerald system for example, the simple object handle would encompass Emerald's integer identifier and forwarding address, while in the other example mentioned above, the simple object handle would encompass the network address and related object identifier.

Figure 3:
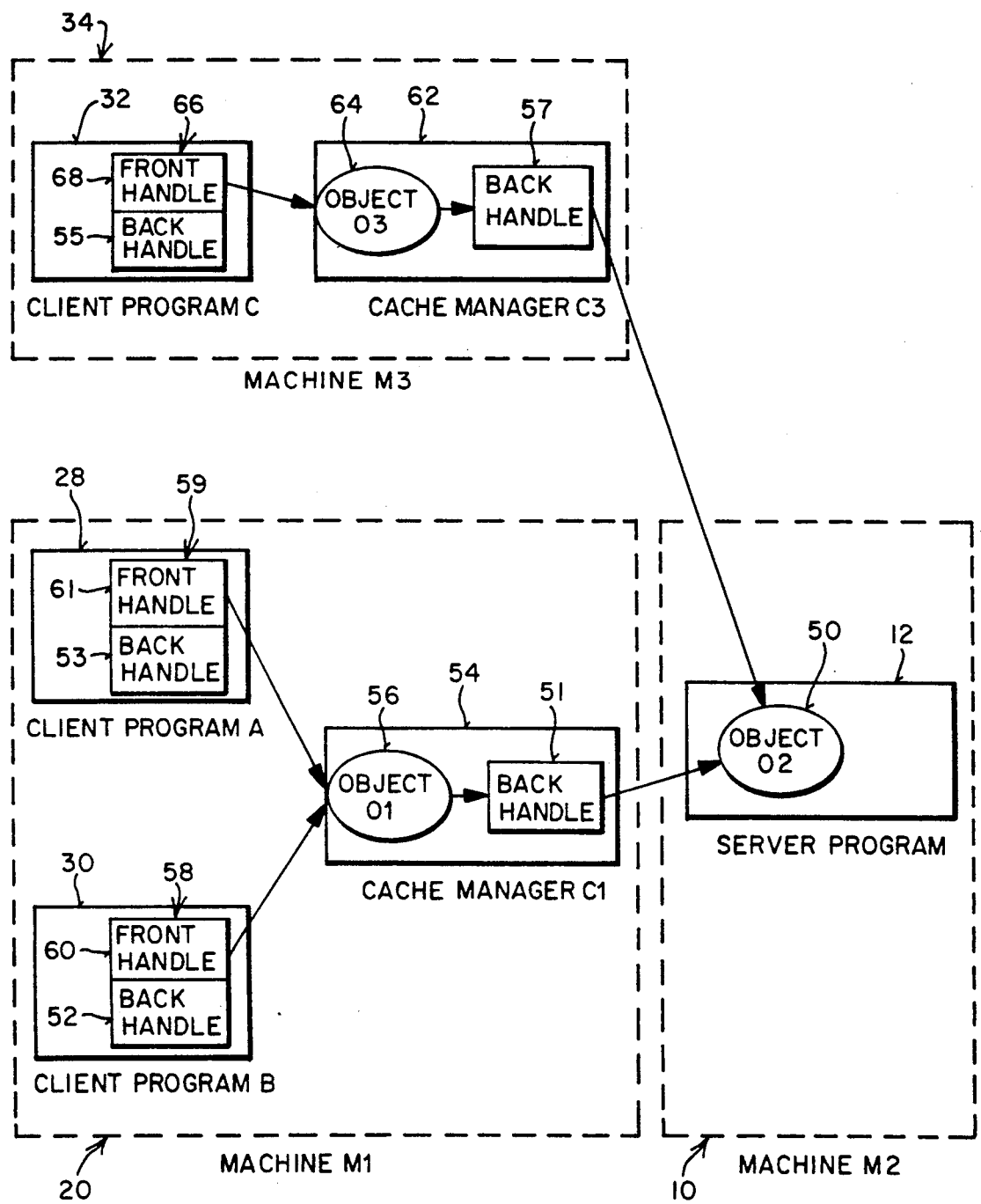
FIG. 3 illustrates the use of the simple cachable handle.

The first solution comprises a new kind of object handle called a "simple cachable handle" that has been designed to include more information than simple object handles so that suitable caching can be exploited. The representation of a simple cachable handle consists of two parts, both of which are themselves simple object handles. The first part of the simple cachable handle is called the "front handle." Normally this front handle points to a cache manager on the local machine (called the "local" cache manager). The second part of the simple cachable handle is a handle called the "back handle", which always points to the underlying server object (the "target object"). Referring now to FIG. 3 an exemplary client-server configuration is shown, wherein client programs A and B 28,30 reside on machine M1 20, client program C 32 resides on machine M3 34, and the server program 12 resides on machine M2 10. In this illustration client programs A and B 28,30 are shown with each having a simple cachable handle 58,59. The simple cachable handles 58,59 shown comprise a front handle 60,61 and a back handle 52,53. The front handles 60,61 point to object O1 56 in cache manager C1 54 which uses the back handle 51 to point to object O2 50 located in server program 12 on machine M2 10. Client programs A and B 28,30 could also use the back handle 52,53 portions of their simple cachable handles to point directly to object O2 50 if necessary. Client program C 32 on machine M3 34 also has a simple cachable handle 66. However the front handle 68 of simple cachable handle 66 differs from the front handles 60,61 of simple cachable handles 58,59 shown in client programs A and B 28,30 on machine M1 20. The front handle 68 of simple cachable handle 66 points to object O3 64 in cache manager C3 62 which is also located on machine M3 34. In this example of using simple cachable handles, an operation on the simple cachable handle would normally be turned into an operation on the front handle. In the situation where a program (the "receiving program") receives a simple cachable handle from another program, the following actions are performed:

1. The front handle is checked to determine if it points to a cache manager on the same machine as that which the receiving program is on. If this is true, then the front handle of the received simple cachable handle is used and no further tests are performed, and the remaining actions are skipped.
2. If the front handle does not point to a cache manager on the same machine as the receiving program is on, a cache manager on that machine is selected (that is, a "local" cache manager). This selection must be based upon static information that is independent of the object handle that is being received. For example, a local cache manager might be selected based upon the expected type of the object.
3. The selected local cache manager is given the back handle portion of the simple cachable handle and is requested to perform caching for the receiving program.
4. The selected local cache manager returns a handle that references a local object in the cache manager, and this handle which it returns becomes the front handle in the simple cachable handle on that machine. This local cache manager may be reusing a previously created object that references the underlying object or it may have created this cache object just for the receiving program.
5. The receiving program then fabricates the new simple cachable handle consisting of the front handle from the local cache manager program and the back handle that was transmitted to the receiving program.

If any of the steps 2 through 5 above fail, the receiving program simply uses the back handle as the front handle. Thus, if a given machine does not have a suitable cache manager, or if that cache manager is uncooperative, the receiving program can still communicate with the underlying service, albeit without the advantage of caching on the local machine but also without the disadvantage of the unnecessary use of the cache manager on the transmitting machine as was illustrated in FIG. 2. When the receiving program retransmits the simple cachable handle to another application program, that application again has the opportunity of attempting to contact an appropriate cache manager on its machine.

In summary, simple cachable handles are a category of object handles that may be mutated so that they always reference the same underlying object, but can be redirected to use a different cache manager whenever they are transmitted to another application program. The front handle may change, but the back handle remains constant.

The above alternative implementation of the present invention has the disadvantage that it requires the program that receives a simple cachable handle to predetermine which cache manager it wants to use. However, a machine may have several different cache managers that specialize in caching different kinds of objects, based either upon the locations of the objects or on the caching algorithms that are used. Accordingly, the preferred embodiment of the present invention employs a new kind of object handle called an "Extended Cachable Handle" that is designed to permit the automatic selection of the local cache manager based upon the actual characteristics of the target object.

The representation of the extended cachable handle consists of three parts, two of which are simple object handles as described above. The first part of the extended cachable handle is called the "front handle" which normally points to a cache object on the local machine. The second part of the extended cachable handle is called the "back handle" which points to the true underlying object (the "target object"). The third part of the extended cachable handle is called the "cache service name" or just the "Cache Name", which identifies the kind of caching service that understands how to manage caching for this particular object. As in the case of the simple cachable handles described above, extended cachable handles are a category of object handles that may be mutated during transmission so that they always reference the same underlying object, but can be redirected to use a different cache manager whenever they are transmitted to another application program. The front handle may change, but the back handle, and the cache service name remain constant.

In the preferred embodiment, the extended cachable handle is created by the server program when the underlying object is created. The cache service name and the back handle are assigned by the server program which also initially sets the front handle equal to the back handle. Also in the preferred embodiment, each machine provides a naming service which lets programs map from the cache service name into cache manager programs that run on that machine and which are able to support a given style of caching. When cache manager programs start up they will register themselves with this naming service in a way which relates the cache service name to the specific cache manager program. Thus by use of the machines naming service the cache manager programs may be found by client programs running on that machine. The use of these extended cachable handles is illustrated in FIG. 4.

Figure 4:
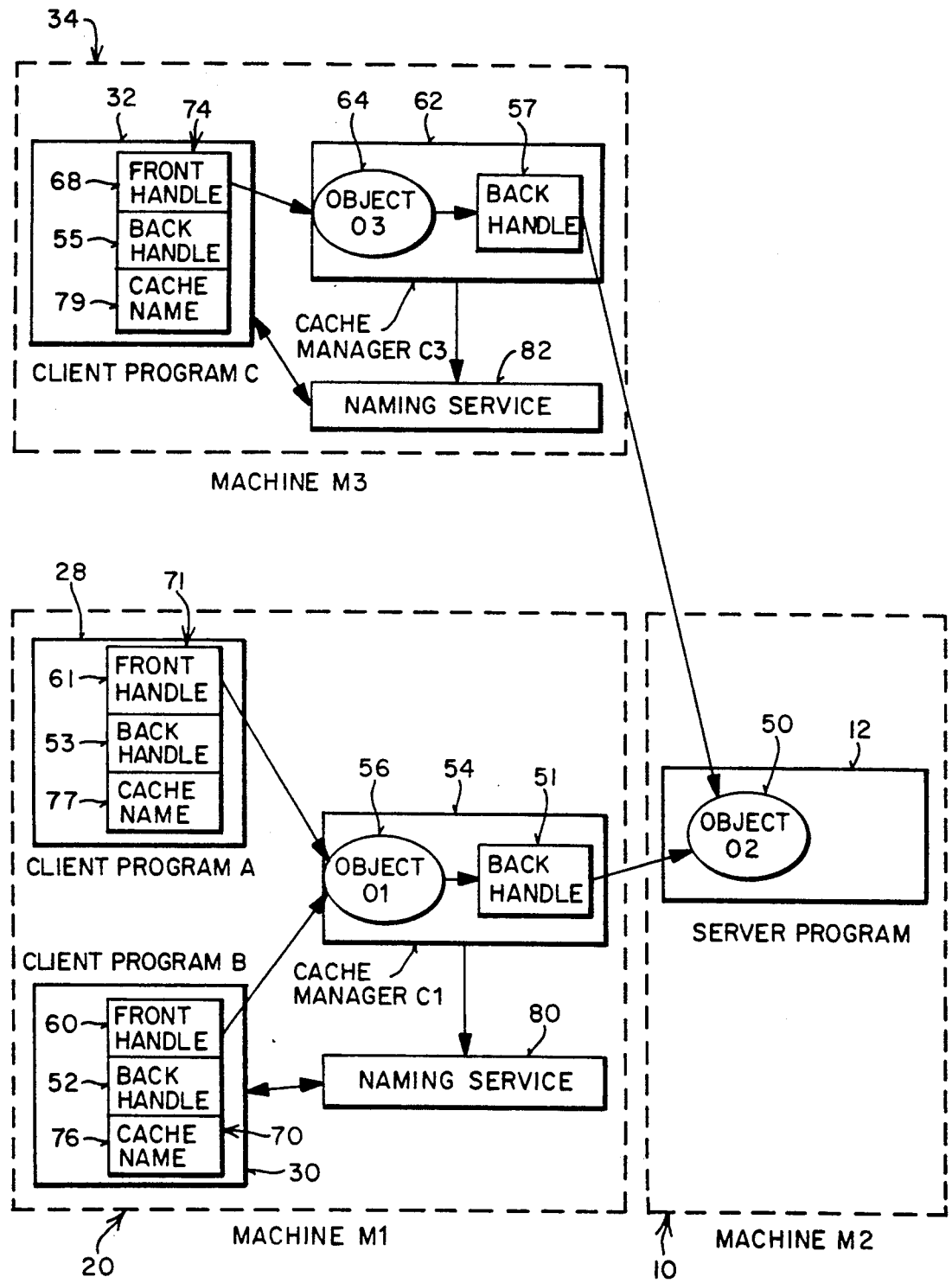
FIG. 4 illustrates the use of the extended cachable handle.

Referring now to FIG. 4, an exemplary client-server configuration is shown, wherein client programs A and B 28,30 reside on machine M1 20, client program C 32 resides on machine M3 34, and the server program 12 resides on machine M2 10. In this illustration client programs A and B 28,30 are shown with each having an extended cachable handle 70,71. The extended cachable handles 70,71 shown comprise a front handle 60,61, a back handle 52,53 and a cache service name ("cache name") 76,77. The cache names 76,77 were used by client programs A and B 28,30 to obtain a pointer to cache manager C1 54 from the naming service 80. The client programs A and B 28,30 then communicated with cache manager C1 54 sending it back handles 52,53 and receiving in reply the front handles 60,61 respectively. These front handles 60,61 point to object O1 56 in cache manager C1 54 who uses the back handle 51 to point to object O2 50 located in server program 12 on machine M2 10. Client programs A and B 28,30 could also use the back handles 52,53 portions of their extended cachable handles to point directly to object O2 50 if necessary. Client program C 32 on machine M3 34 also has an extended cachable handle 74. However the front handle 68 of extended cachable handle 74 differs from the front handles 60,61 of extended cachable handles 70,71 shown in client programs A and B 28,30 on machine M1 20. The front handle 68 of extended cachable handle 74 points to object O3 64 in cache manager C3 62 which is also located on machine M3 34. This front handle 68 was obtained by client program C 32 by first using the naming service 82 on machine C3 34 to resolve the cache service name 79 into a pointer to the local cache manager C3 62. The Program C 32 then communicated with the cache manager C3 62, sending it the back handle 55 and receiving in reply the front handle 68.

Figure 5:
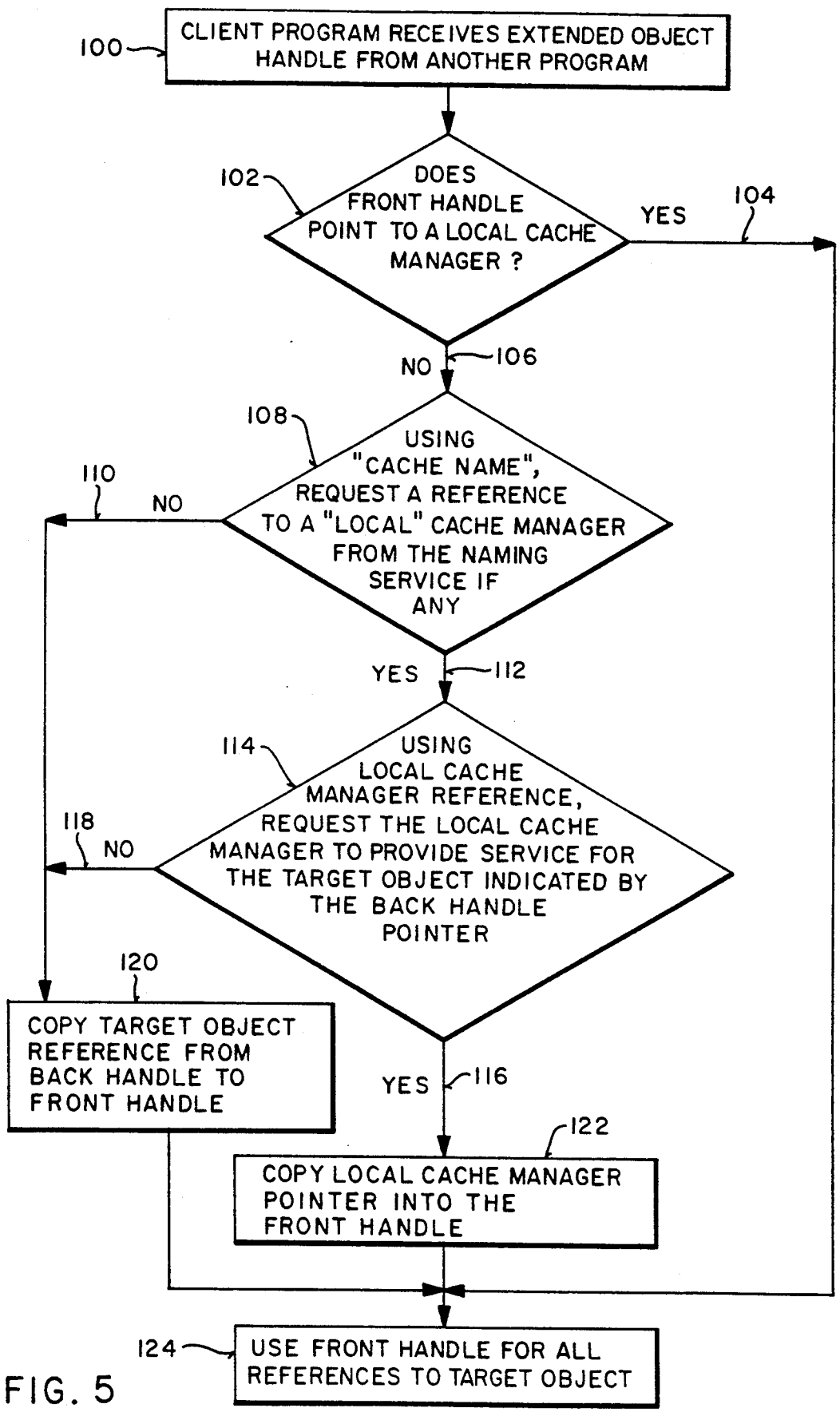
FIG. 5 is a block diagram showing an exemplary implementation of the preferred embodiment.

In this example of using extended cachable handles, an operation on the extended cachable handle would normally be turned into an operation on the front handle. Referring now to FIG. 5, in the situation where a program (the "receiving program") receives an extended cachable handle from another program 100, the following actions are performed:

1. The front handle is checked to determine if it points to a cache manager on the same machine as that which the receiving program is on 102. If this is true 104, then the front handle of the received extended cachable handle is used and no further tests are performed, and the remaining actions are skipped.

2. If the front handle does not point to a cache manager on the same machine 106, the receiving program uses his machine's naming service to map the cache service name portion of the extended cachable handle into the reference to a local cache manager that is prepared to deal in the kind of object indicated by the extended cachable handle 108.

3. If such a reference is available 112, the receiving program then presents the indicated local cache manager with the back handle portion of the extended cachable handle and requests that this cache manager perform caching for the receiving program 114.

4. If the local cache manager agrees to provide such service 116, this cache manager returns a handle that references a local object in the cache manager to the receiving program who will use this reference as the front handle in its extended cachable handle. The cache manager may be reusing a previously created object that references the underlying object or it may have created this cache object just for the receiving program.

5. The receiving program then adds the front handle obtained from the cache manager to the back handle and cache service name which were transmitted to the receiving program to form a revised extended cachable handle representation 122.

If steps 3 or 4 of this procedure fail, the receiving program simply uses the back handle as its front handle 120. Thus if a given machine does not have a suitable cache manager 110, or that cache manager is uncooperative 118 the receiving program can still communicate with the underlying object, although without the benefit of local caching but also without the disadvantage of unnecessarily communicating through another machine. When the receiving program transmits the extended cachable handle to another application program that application again has the opportunity of attempting to contact an appropriate cache manager on its own machine.

In both the preferred embodiment using the extended cachable handles and the alternate embodiment using the simple cachable handles, all of the components of these handles are transmitted whenever requested. Another alternative embodiment of the invention which could be used with either the extended cachable handles or simple cachable handles would avoid transmitting the front handle. In that case the receiving program would always be responsible for finding a suitable front handle. This could be managed by skipping step 1 in each of the procedures outlined above.

While the present invention has been described in terms of a presently preferred embodiment and alternative embodiments, those skilled in the art will recognize that the invention is not limited to the embodiments described. The method and apparatus of the present invention can be practiced with modification and alteration within the spirit and scope of the appended claims. The descriptions are thus to be regarded as illustrative instead of restrictive on the present invention.

We claim:

1. In a computer system adapted for using object oriented programming and software caching techniques in a distributed computing environment, a method for a receiving client to use a local cache manager in making reference to a target object, said method comprising the steps of:

a) receiving an augmented object handle by said receiving client which comprises a reference to said target object and a reference to a first cache manager;

b) fabricating a new augmented object handle by replacing said reference to said first cache manager with a reference to a second cache manager local to said receiving client if said first cache manager is not on a same machine as is said receiving client;

c) fabricating a new augmented object handle by replacing said reference to said first cache manager with a reference to said target object itself if said first cache manager is not on a same machine as is said receiving client and if there is no suitable cache manager available to provide caching services for said target object on said same machine; and d) using said new augmented object handle to invoke operations on said target object.

2. The method as set forth in claim 1, wherein the augmented object handle is a simple cachable handle which comprises said target object reference (hereinafter called the back handle) and an additional object reference (hereinafter called the front handle), said front handle containing said reference to said first cache manager.

3. The method as set forth in claim 2, comprising the additional step of selecting a suitable local cache manager on said receiving client's machine which has the ability to provide caching services for said target object.

4. The method as set forth in claim 3, comprising the additional step of said receiving client presenting said target object reference to said suitable local cache manager and requesting said suitable local cache manager to perform caching services for said receiving client so that said suitable cache manager can determine whether caching services are already set up for said target object.

5. The method as set forth in claim 4, comprising the additional step of said suitable local cache manager returning a handle that references a local object in said suitable local cache manager which said receiving client can use as a new front handle.

6. The method as set forth in claim 5, comprising the additional step of said receiving client fabricating a new simple cachable handle by using said back handle originally received and using said new front handle to reference said suitable local cache manager if said suitable local cache manager was identified and agreed to perform caching services, said suitable local cache manager indicating agreement by not returning an exception message.

7. The method as set forth in claim 5, wherein said receiving client fabricates a new simple cachable handle by using said back handle originally received and using said back handle as the new front handle if said suitable local cache manager was not identified or if said suitable local cache manager did not agree to provide caching services, whereby said new simple cachable handle points directly to said target object.

8. The method as set forth in claim 6, wherein said receiving client can communicate said new simple cachable handle to another client.

9. The method as set forth in claim 1, wherein the augmented object handle is an extended cachable handle which comprises said target object reference (hereinafter called the back handle), said reference to said first cache manager (hereinafter called the front handle) and an additional reference (hereinafter called the cache service name).

10. The method as set forth in claim 9, wherein said receiving client can request and receive said extended cachable handle.

11. The method as set forth in claim 10, comprising the additional step of said receiving client selecting a suitable local cache manager on said receiving client's machine by using a naming service on said receiving client's machine to map said cache service name into a reference to said suitable local cache manager, said suitable cache manager being a cache manager which has the ability to provide caching services for said target object.

12. The method as set forth in claim 11, comprising the additional steps of said suitable local cache manager returning a handle that references a local object in said suitable local cache manager whenever requested to do so, and said receiving client using said returned handle as a new front handle.

13. The method as set forth in claim 12, wherein said receiving client fabricates a new extended cachable handle by using said back handle and said cache service name originally received and using said new front handle to reference said suitable local cache manager if said suitable local cache manager was identified and agreed to perform caching services, said suitable local cache manager indicating agreement by not returning an exception message.

14. The method as set forth in claim 12, wherein said receiving client fabricates a new extended cachable handle by using said back handle and said cache service name originally received and using said back handle as the new front handle if a suitable local cache manager was not identified or if said identified suitable local cache manager did not agree to provide caching services.

15. The method as set forth in claim 13, wherein said receiving client can communicate said new extended cachable handle to another program.

16. The method as set forth in claim 9, wherein said receiving client uses said extended cachable handle unchanged if said receiving client determines, upon receipt of said extended cachable handle, that said front handle points to a cache manager on said receiving client's machine.

17. The method as set forth in claim 2, wherein said receiving client uses said simple cachable handle unchanged if said receiving client determines upon receipt of said simple cachable handle that, said front handle points to a cache manager on said receiving client's machine.

18. In a computer system adapted for using object oriented programming and software caching techniques in a distributed computing environment, an apparatus for enabling a receiving client to use a local cache manager in making reference to a target object, said apparatus comprising:
   a) a computer containing said receiving client, said receiving client having the ability to receive an augmented object handle from another client, said augmented object handle having associated with it a reference to a first cache manager and a reference to said target object;
   b) a first computer logic means coupled to said computer, for altering said augmented object handle to modify said reference to said first cache manager to a reference to a second cache manager local to said receiving client if said first cache manager is not on said computer containing said receiving client; and
   c) a second computer logic means coupled to said computer for altering said augmented object handle to modify said reference to said first cache manager to a reference to the target object itself if said first cache manager is not on said computer containing said receiving client and if there is no suitable cache manager available to provide caching services for said target object on said computer containing said receiving client;
   whereby said receiving client can use said new augmented object handle to invoke operations on said target object.

19. The apparatus as set forth in claim 18, wherein said augmented object handle is a simple cachable handle which comprises said target object reference (hereinafter referred to as the back handle) and an additional object reference (hereinafter referred to as the front handle).

20. The apparatus as set forth in claim 19, further comprising a selection logic mechanism coupled to said computer, whereby said receiving client can identify a local cache manager which has the ability to provide caching services for said target object on said computer containing said receiving client.

21. The apparatus as set forth in claim 20, further comprising a transmission logic means coupled to said receiving client enabling said receiving client to transmit said back handle to said identified local cache manager and to request that said identified local cache manager perform caching services for said target object, so that said identified local cache manager can determine whether caching services are already set up for said target object.

22. The apparatus as set forth in claim 21, wherein said identified local cache manager can use said transmission means to return a handle that references a local object in said identified local cache manager which is used by said receiving client as a new front handle.

23. The apparatus as set forth in claim 22, wherein said first computer logic means can be used for fabricating a new simple cachable handle by using said back handle originally received and using said new front handle to reference said identified local cache manager, if a local cache manager was identified and agreed to perform caching services, said identified local cache manager indicating agreement by not returning an exception message.

24. The apparatus as set forth in claim 23, wherein said receiving client has the ability to use said first computer logic means to fabricate a new simple cachable handle by using said back handle originally received and using said back handle as the new front handle if a local cache manager was not identified or if said identified local cache manager did not agree to provide caching services, whereby said new simple cachable handle points directly to said target object.

25. The apparatus as set forth in claim 18, wherein said augmented object handle is an extended cachable handle which comprises said target object reference (hereinafter referred to as the back handle) and two additional references (hereinafter referred to as a front handle and a cache service name).

26. The apparatus as set forth in claim 25, further comprising a selection logic mechanism, coupled to said computer, which provides the ability to select a suitable local cache manager on said computer containing said receiving client by using a naming service on said computer containing said receiving client to map said cache service name into said suitable local cache manager, said suitable local cache manager being a cache manager which has the ability to provide caching services for said target object.

27. The apparatus as set forth in claim 26, further comprising a transmission logic means coupled to said computer enabling said receiving client to transmit said back handle to said suitable local cache manager and to request that said suitable local cache manager perform caching services for said target object.

28. The apparatus as set forth in claim 27, wherein said suitable local cache manager has the ability to use said transmission logic means to return a handle that reference a local object in said suitable local cache manager which can be used by said receiving client as a new front handle.

29. The apparatus as set forth in claim 28, wherein said first computer logic means can be used for fabricating a new extended cachable handle by using said back handle and said cache service name originally received and using said new front handle to reference said suitable local cache manager, if a suitable local cache manager was identified and agreed to perform caching services, said suitable local cache manager indicating agreement by not returning an exception message.

30. The apparatus as set forth in claim 29, wherein said receiving client has the ability to use said first computer logic means to fabricate a new extended cachable handle by using said back handle and said cache service name originally received and using said back handle as the new front handle if a suitable local cache manager was not identified or if said suitable local cache manager was identified but did not agree to provide caching services, whereby said new extended cachable handle points directly to said target object.

31. The apparatus as set forth in claim 30, wherein said receiving client has the ability to communicate said new extended cachable handle to another client.

* * * * *